US012809712B2

(12) United States Patent
Heber et al.

(10) Patent No.: US 12,809,712 B2
(45) Date of Patent: Nov. 24, 2026

(54) CONTROL DEVICE AND METHOD FOR CORRECTING A GUIDE VALUE AND/OR A RESULTING VALUE OF A SYNCHRONIZATION FUNCTION

(71) Applicant: Siemens Aktiengesellschaft, Munich (DE)

(72) Inventors: Tino Heber, Freiberg (DE); Thomas Hess, Limbach-Oberfrohna (DE); Bernhard Kohlhas, Höchstadt an der Aisch (DE); Raimund Kram, Erlangen (DE); Manfred Popp, Zirndorf (DE); Elena Schönberger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 710 days.

(21) Appl. No.: 18/265,723

(22) PCT Filed: Nov. 11, 2021

(86) PCT No.: PCT/EP2021/081416

§ 371 (c)(1),
(2) Date: Jun. 7, 2023

(87) PCT Pub. No.: WO2022/122296

PCT Pub. Date: Jun. 16, 2022

(65) Prior Publication Data

US 2024/0045755 A1 Feb. 8, 2024

(30) Foreign Application Priority Data

Dec. 8, 2020 (EP) .................................... 20212456

(51) Int. Cl.
*G05B 19/18* (2006.01)
*G06F 11/07* (2006.01)

(52) U.S. Cl.
CPC .......... *G06F 11/0793* (2013.01); *G05B 19/18* (2013.01)

(58) Field of Classification Search
CPC ............................ G06F 11/0793; B05B 19/18
See application file for complete search history.

(56) References Cited

U.S. PATENT DOCUMENTS 5,175,680 A * 12/1992 Yoneda ................ G05B 19/182
318/632
2003/0191544 A1 10/2003 Faulhammer et al.
(Continued)

FOREIGN PATENT DOCUMENTS

DE 10312379 10/2003
DE 102019006642 4/2020
(Continued)

OTHER PUBLICATIONS

Sieens: “Materialvorschub für eine 1-11 Presse auf Basis von statischen Kurvenscheiben”; Applikation Zur Antriebstechnik, Germany; Sep. 28, 2007 (Sep. 28, 2007).
(Continued)

*Primary Examiner* — Mark A Connolly
(74) *Attorney, Agent, or Firm* — Cozen O’Connor

(57) ABSTRACT

A control device and method for correcting a guide value and/or a resulting value of a synchronization function, wherein the guide value and/or the resulting value is/are corrected via a correction function, a correcting range of the correction function being specified via an effective guide value path, where an effective start of the correction function is specified via an effective guide value position, where the corrected guide value of a synchronization function is transferred as an input and/or the corrected resulting value is output as a target value to a successive axis.

13 Claims, 5 Drawing Sheets

(56) References Cited

U.S. PATENT DOCUMENTS

| | | | | |
|---|---|---|---|---|
| 2005/0035734 | A1 | 2/2005 | Haunerdinger et al. | |
| 2015/0362895 | A1* | 12/2015 | Horiguchi .............. | G05B 19/19<br>318/561 |
| 2017/0038746 | A1* | 2/2017 | Hirose ................. | G05B 19/416 |
| 2019/0332095 | A1 | 10/2019 | Kram | |
| 2020/0103852 | A1* | 4/2020 | Hirose ................. | G05B 19/416 |

FOREIGN PATENT DOCUMENTS

| | | |
|---|---|---|
| EP | 3561621 | 10/2019 |
| WO | 2015128981 | 9/2015 |

OTHER PUBLICATIONS

PCT International Search Report and Written Opinion of International Searching Authority mailed Feb. 8, 2022 corresponding to PCT International Application No. PCT/EP2021/081416 filed Nov. 11, 2021.

* cited by examiner

CONTROL DEVICE AND METHOD FOR CORRECTING A GUIDE VALUE AND/OR A RESULTING VALUE OF A SYNCHRONIZATION FUNCTION

CROSS-REFERENCE TO RELATED APPLICATIONS

This is a U.S. national stage of application No. PCT/EP2021/081416 filed 11 Nov. 2021. Priority is claimed on European Application No. 20212456.6 filed 8 Dec. 2020, the content of which is incorporated herein by reference in its entirety.

BACKGROUND OF THE INVENTION

1. Field of the Invention

The invention relates to a control device and method for correcting a leading value and/or a following value of a synchronism function.

2. Description of the Related Art

A plurality of drive axes are involved in many fields of application in industrial automation. A plurality of axes, for example, are to be synchronized or aligned with one another to achieve a precise movement, handling or processing. In processing machines or production machines, or less frequently machine tools also, and particularly in the case of printing machines, cross-cutting machines or tubular bag machines, two or more axes are to be aligned with one another, for example, such that synchronism is achieved. Axes, for example, operating in the synchronous operation group are necessary in the printing machine domain for performing technical tasks, such as ink application via printing rollers, and also cutting and folding via folding apparatuses, or a flying shear in the vicinity of packaging machines or, in other applications, operation of a cross-cutter.

In accordance with the notion of synchronism, a position of a following axis corresponds as closely as possible or as precisely as possible to the position of a leading axis while complying with the law of synchronism. Synchronism of this type is intended to be flexible, not only in uniform systems in which axes or the setpoints that are predefined on the respective axes are calculated within a controller, but also in non-uniform systems in which, for example, distributed synchronism occurs. In the case of distributed synchronism, different axes or their setpoints are calculated in different control components that communicate via a common bus. Non-uniform systems can further arise due to different calculation clocks for different axes within a control component. A system having different dynamic characteristics of different axes can also be regarded as a non-uniform system.

For the precise implementation of synchronism applications, it is necessary to perform corrections on the values that are transferred to the following axis. Corrections are intended to be performed or implemented such that they correspond as precisely as possible to the leading axis.

SUMMARY OF THE INVENTION

In view of the foregoing, it is an object of the present invention is provide a control device and method for correcting a guide value and/or a resulting value of a synchronization function so as to improve the correction of synchronism between a leading axis and at least one following axis.

This and other objects and advantages are achieved in accordance with the invention by a method for correcting a leading value and/or a following value of a synchronism function, where the leading value and/or the following value is/are corrected via a correction function, where a correcting range of the correction function is predefined via an effective leading value path, where an effective start of the correction function is predefined via an effective leading value position, and where the corrected leading value is transferred as an input to a synchronism function and/or the corrected following value is output as a setpoint to a following axis.

In particular, corrections are intended to be made to the leading value that is transferred to the synchronism function, or are alternatively or additionally intended to be made to the following value determined via the synchronism function. The correction therefore takes effect on the following axis. The corrections finally take effect on the following axis and are applied either to the leading value before the synchronism function (correction on the leading value side) or to the following value after the synchronism function (correction on the following value side). The correction thus takes effect on the position of the following axis and is then also implemented by the latter.

The effective leading value path is defined based on the effective start and an indication of a relative length or a further absolute effective leading value position as the end position.

A leading-value-related implementation of corrections necessary for the correct synchronism is advantageously enabled via the correction function with a correction range and effective start. Advantageously, in particular, no separate synchronism or separate cams that would have to be connected upstream need to be programmed so that a correction of the leading value can be performed. An upstream synchronism function intended for the correction of the following value, i.e., an additional synchronism function performed on the leading value and addition of the functional value on the following axis, can also be eliminated. It is equally unnecessary to perform corrections of the leading value or the following value via dynamic profiles over time, rigidly and independently from a modification of the leading value.

With the proposed solution, on one hand, the complex programming, possibly with a plurality of synchronism functions and a plurality of coordinate systems and specifically with defined cams, can therefore be avoided, and, on the other hand, the correction range defined base on the leading value further enables the correction to be incorporated depending on the dynamics of the leading value and not, for example, in a rigidly time-dependent manner. With the inventive method, in the event of a fast change in the leading value, corrections can correspondingly also be incorporated quickly or, conversely, in the event of a slow change in the leading value, correspondingly more slowly. An incorporation of a fixed amount in a fixed, specific, predefined time period is therefore advantageously eliminated.

In embodiments where the leading value is corrected, a direct integration into function blocks of the PLCopen standard, in particular into the MC_PhasingRelative or MC_PhasingAbsolute function blocks, is implemented. If the following value is corrected, then an extension of the MC_MoveSuperimposed PLCopen function block is implementable, or the definition of separate function blocks, such as MC_OffsetRelative and MC_OffsetAbsolute, where MC_OffsetAbsolute corresponds to the analogous definition for the MC_PhasingRelative or MC_PhasingAbsolute function blocks only for the correction after the application of synchronism function.

The indicated correction range is automatically maintained by proceeding with the leading value. The correction is advantageously implemented at the speed of the leading value. In one embodiment, the leading value position indication is indicated for the leading value before the leading-value-related correction or, in a different embodiment, for the leading value after the leading-value-related correction.

The correction function can therefore be a leading-value-related leading value correction or a leading-value-related following value correction. In other words, a leading-value-related correction on the leading value side or a leading-value-related correction on the following value side can be performed. Both values, the leading value and the following value of the synchronism function, can further be corrected with the correction function so that both correction mechanisms take effect successively and are therefore active simultaneously during a synchronization.

In accordance with an embodiment, the correction function is performed using the leading value via a system-specific function, in particular a polynomial function, an more particularly a polynomial function with a trigonometric component. The profile for the incorporation of the correction is preferably defined by the system, i.e., is integrated directly into the programming of a synchronism system. Programming is performed, for example, via PLCopen commands or PLCopen-consistent commands, so that a direct incorporation into the programming and into the solution definition can be performed in accordance with the PLCopen standard. In particular, continuous programming can be performed in accordance with PLCopen Part1 Function Blocks for Motion Control.

The correction is incorporated, for example, as a system-specific polynomial function via the leading value path. A polynomial profile is defined via the leading value from the correction value, i.e., an amount of a correction to be incorporated and the leading value path indicated by the user depending on boundary conditions at the starting point and end point.

In accordance with another embodiment, the correction function is defined via a correction start position and a correction end position. Along with a direct predefinition of the correction range of the correction function via an effective leading value path indicated by the user, i.e., a leading value range, the correction end position "up to leading value position" can alternatively be indicated. Otherwise, the latter is derived from the indicated leading value path for the correction performance.

In accordance with a further embodiment, the effective start and the effective leading value path are optimally related to a process to be carried out. If, for example, a knife of a cross-cutter or shear is not engaged in an application with a flying shear, then the entire remaining range of the leading value can be used for the correction. The range of the leading value in which the following axis is not engaged with other process components can be considered as a suitable correction range.

In accordance with another embodiment, the correction function is defined as a function depending on a leading value position. In particular, the value or the amount of a correction to be incorporated is defined by means of the leading value position.

In accordance with an embodiment, the correction function is constant at least in the first and second derivative. Abrupt transitions in the acceleration and deceleration curve and therefore abrupt or sudden transitions in the force and moment curve are therefore avoided. The constancy requirement is particularly satisfied within the function and also in terms of the values present in the edge points.

If the correction function is performed at constant speed and with constant acceleration, procedure profiles optimized for protection of mechanical parts are advantageously achieved.

In accordance with a further embodiment, the correction function is a polynomial function, a spline, and/or a trigonometric function. Higher-order polynomial functions, for example, in particular fifth-order or higher-order, or fourth-order or higher-order splines, or trigonometric functions can be provided and, in particular combinations thereof.

In accordance with an embodiment, a maximum correction value is determined for the definition of the correction function depending on at least one of the following variables: leading value speed, current gearing factor of the synchronism function, maximum dynamic values of the axis or predefined effective leading value path. Further criteria are therefore optionally predefinable for determining a suitable correction function. In the correction to be incorporated, a maximum amount of the correction, for example, depending on the dynamics of the axes involved, can also be chosen along with the correction range.

In accordance with a further embodiment, the correction function is ended with the ending of the synchronization. The correction function would therefore have to be restarted in relation to a new synchronization.

The objects and advantages in accordance with the invention are also achieved by a control device for correcting a leading value and/or a following value of a synchronism function, having a control program function block to implement the method in accordance with disclosed embodiments. The control device is preferably a controller for operating at least two axes in synchronism, and includes processor memory. The leading value to be corrected and/or the following value to be corrected are therefore located on the same controller.

In accordance with an embodiment, the control program function block is formed as a PLCopen function block. A functional extension of the standardized PLCopen program function blocks is advantageously enabled via the control program function block.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below on the basis of exemplary embodiments with reference to the figures, in which.

DETAILED DESCRIPTION OF THE EXEMPLARY EMBODIMENTS

Unless otherwise indicated, elements having identical functions are denoted with the same reference symbols in the figures.

Figure 1:
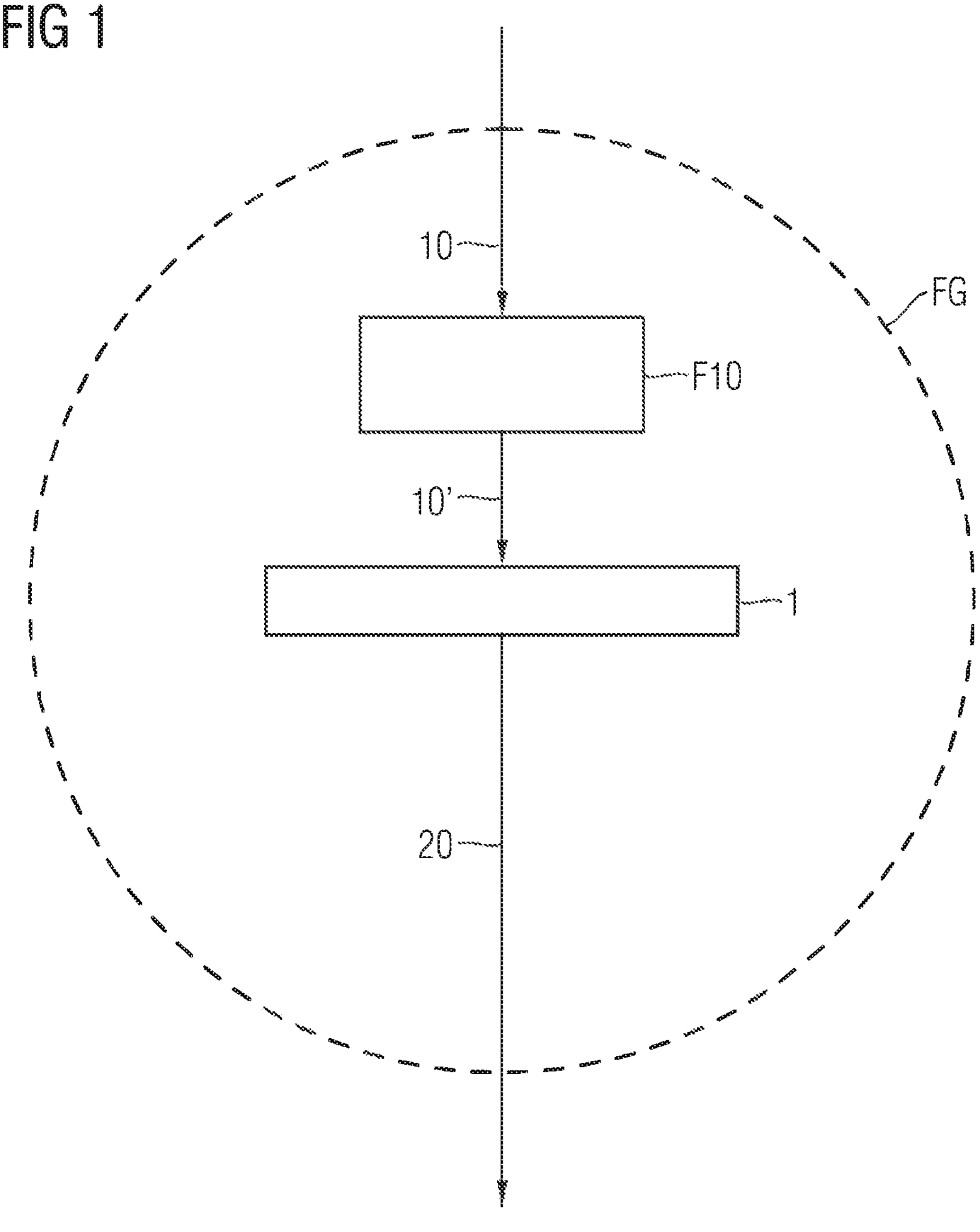
FIG. 1 shows a schematic view to illustrate the correction method in accordance with a first exemplary embodiment.

FIG. 1 illustrates a correction method for correcting a leading value in accordance with a first exemplary embodiment of the invention. A flow diagram of a correction method for a synchronism function 1 is comprised in the circular area FG. The aim and object of the synchronism function 1 is to generate a following value 20 from a leading value 10 that is received by a leading axis, where the following value 20 is transferred as a setpoint to a following axis. The synchronism function 1 can implement, for example, a gearing synchronism or a cam synchronism. A cross-cutter, for example, is operated in synchronism.

Before the leading value 10 is transferred to the synchronism function 1, it is corrected via a leading value correction function block F10. The leading value correction function block F10 is based on the PLCopen standard. The MC_PhasingAbsolute or MC_PhasingRelative PLCopen function block is used, via which the effective leading value is shifted from the perspective of the following axis. This results in a corrected leading value 10' for the synchronism function 1 on the following axis. The actually pending leading value of the leading value interface is not shifted or modified on the leading axis. The leading value correction can be performed either relatively, i.e., in each case in addition to the already existing correction, or as an absolute correction.

The leading value 10 as the effective leading value is made up of the leading value of the leading value interface and the additive leading value.

The corrected leading value 10' of the synchronism function 1 after the phasing function is made up of the leading value of the leading value interface, the additive leading value and the shift of the effective leading value by the phasing commands.

The correction that is intended to be implemented on the following axis in the operation of a cross-cutter is derived, for example, from print marks that are measured on the leading value. In applications in which the leading value is print-mark-corrected, application of the correction of the leading value before transfer to the synchronism function is recommended so that, in a manner of speaking, the synchronism function is corrected.

The PhaseShift acts as a shift on the effective leading value of the leading axis. The effective leading value is therefore stretched or compressed.

Figure 2:
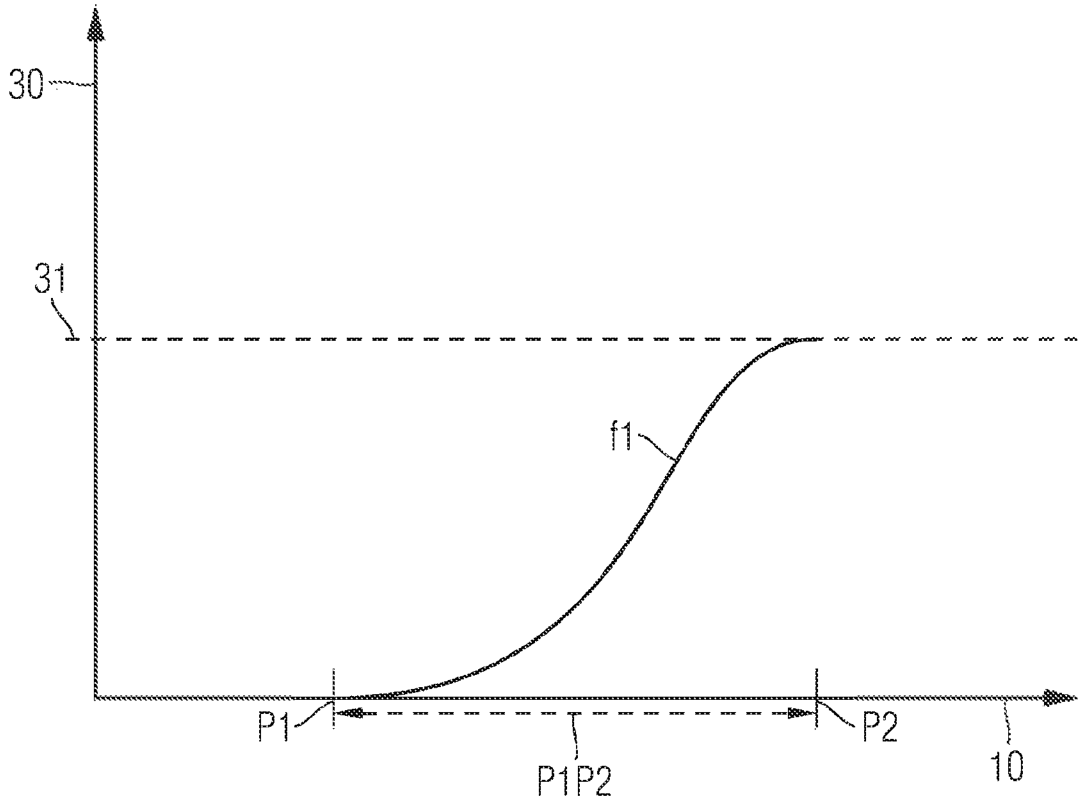
FIG. 2 shows a schematic view of a diagram of a correction function in accordance with the first exemplary embodiment.

Additional reference is made to FIG. 2 for explanation. The x-axis 10 of the coordinate system shown there plots the leading value, while the y-axis 30 plots the correction value that is to be incorporated. A correction function f1 is shown that is constant in the first and second derivative and is in the edge points under the present conditions. The effective leading value path P1P2 is further shown with a correction start position P1. The effective leading value path P1P2 can alternatively be defined indirectly via a correction end position P2.

The PhaseShift is implemented via the effective leading value path P1P2, for example, immediately or from an indicated effective leading value position as the correction start position P1. The effective leading value path can lie in a current direction of movement of the effective leading value or in a positive direction of movement of the effective leading value, or in a negative direction of movement of the effective leading value.

The corrections are not implemented via a time-related speed profile, but by means of a leading-value-related polynomial function with a possible trigonometric component.

The profile of the phasing movement is constant in terms of speed and acceleration. The dynamics of the phasing movement are coupled to the dynamics of the leading value.

The following value 20 is then transferred to the following axis. The leading value correction function block F10 is applicable to the gearing and cam synchronization.

Advantageously, as in the described exemplary embodiment, an application with a flying knife, flying shear or the like can be executed in which, for example, incoming material such as a board or glass to be cut is incorporated into the machine operated in synchronism, at constant speed and print-mark-corrected, where the correction is performed on the following axis via a leading-value-related correction profile on the leading value side.

Figure 3:
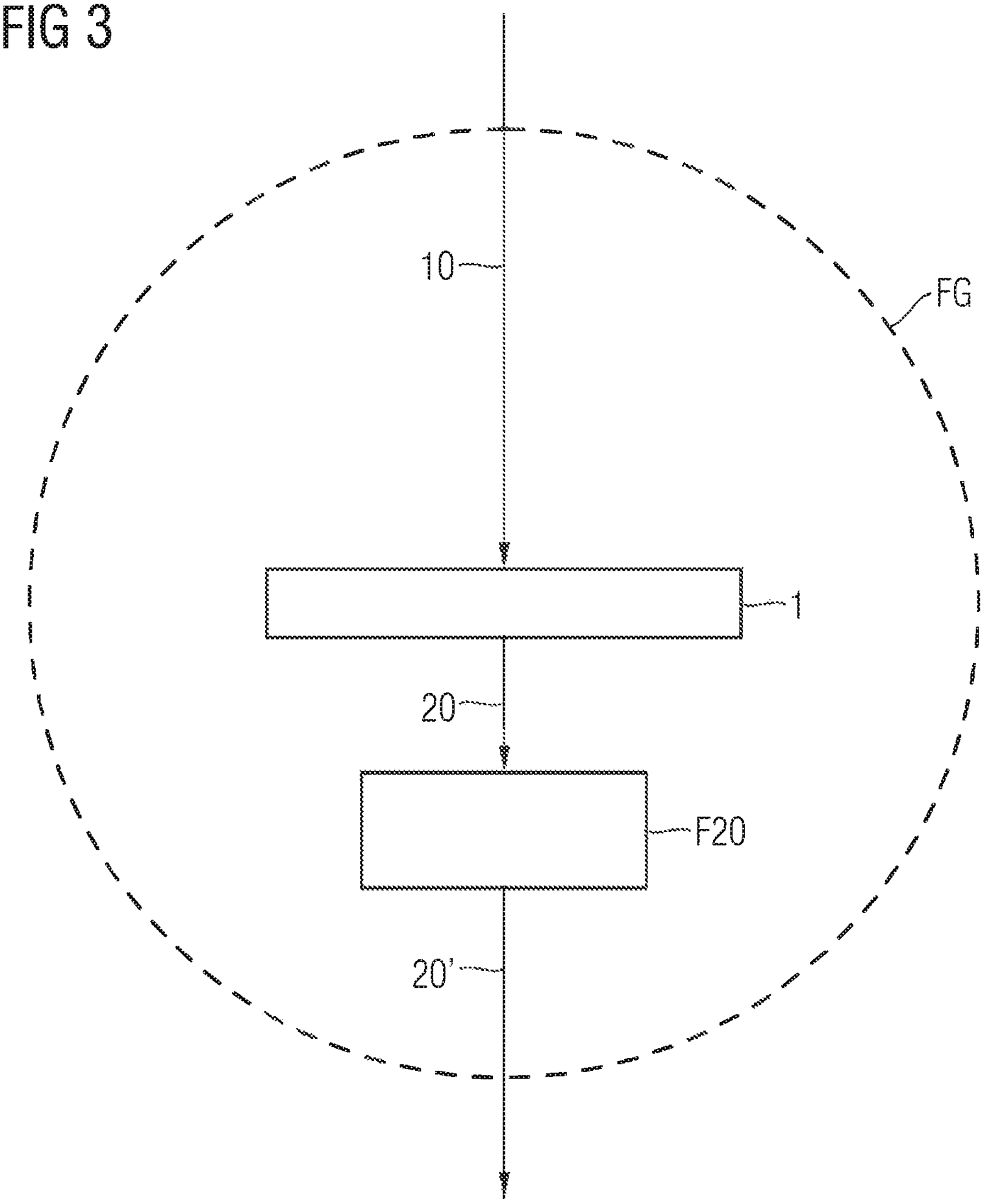
FIG. 3 shows a schematic view to illustrate the correction method in accordance with a second exemplary embodiment.

FIG. 3 shows a second exemplary embodiment of the invention which is used in a tubular bag machine. A foil print, for example, is intended to be operated with a fixed clock that is not intended to be modified. The machine leading value, which is also the leading value for the following axis, is derived from the set machine clock. Corrections resulting from the print marks on the foil print, i.e., the following axis, are thus advantageously performed on the following value, i.e., following the application of the synchronism function.

The correction movement is intended to be started when a specific effective leading value position is attained. Not only sequential print mark corrections predefined alternately to one another are intended to be able to be predefined, but also in each case tendency corrections only.

The correction movement is implemented via a leading-value-related correction of the following value. A following value correction function block F20 is accordingly provided that performs a leading-value-related correction on the following value 20 generated by the synchronism function.

Corresponding MC_OffsetAbsolute and MC_OffsetRelative function blocks are modelled in accordance with the PLCopen schema and are therefore based on the structure of the standardized function blocks. The MC_OffsetAbsolute and MC_OffsetRelative function blocks effect an additional leading-value-related shift of the following value in the cam or gearing synchronism. This takes effect on the following axis following the synchronism function 1. The shift of the following value (offset) is in turn implemented via a predefinable effective leading value path (OffsetDistance) and occurs either immediately when the command is issued or from a predefined effective leading value position (StartPosition).

The MC_OffsetAbsolute/MC_OffsetRelative function blocks effect a shift of the following value 20 following the synchronism function 1 by an additional offset. The position of the leading axis or the leading value 10 is not influenced by this, and only a following-value-side correction is performed on the following axis, albeit in a leading-value-related manner.

The offset reference can be either relative, i.e., in each case in addition to the already existing shift, or absolute.

A typical industrial application of the offset function with respect to the cam synchronism for a leading-value-related correction of the following value occurs, e.g., in the horizontal and/or vertical tubular bag machine from the packaging domain for the execution of the print mark correction. Generally speaking, a leading-value-related correction profile on the following side is suitable in the case of following axes subjected to print mark correction.

The dynamics of the offset movement on the following axis side are derived from the shift of the following value predefined in the command and the indicated effective leading value path that result in a corrected following value 20'. With active cam and gearing synchronism, the shift of the following value is implemented by the following axis via the indicated effective leading value path with constant speed and constant acceleration. The offset order acts as the offset on the following value 20 calculated from the synchronism. The offset is implemented via the indicated effective leading value path P1P2 immediately or from an effective leading value position indicated as the correction start position P1. The effective leading value path lies, for example, in the current direction of movement of the effective leading value, in a positive or in a negative direction of movement of the effective leading value.

The following value is modified after the synchronism function according to the specifications, the cam and gearing synchronism itself remaining active and synchronous.

This shifted setpoint, i.e., the corrected following value 20', is finally output to the following axis.

Print mark corrections, for example, are implemented during the synchronization via the effective leading value path with the following axis. During the programming of the values for incorporating the corrections during the synchronization, the user can advantageously specify the corrections with reference to the effective leading value.

Figure 4:
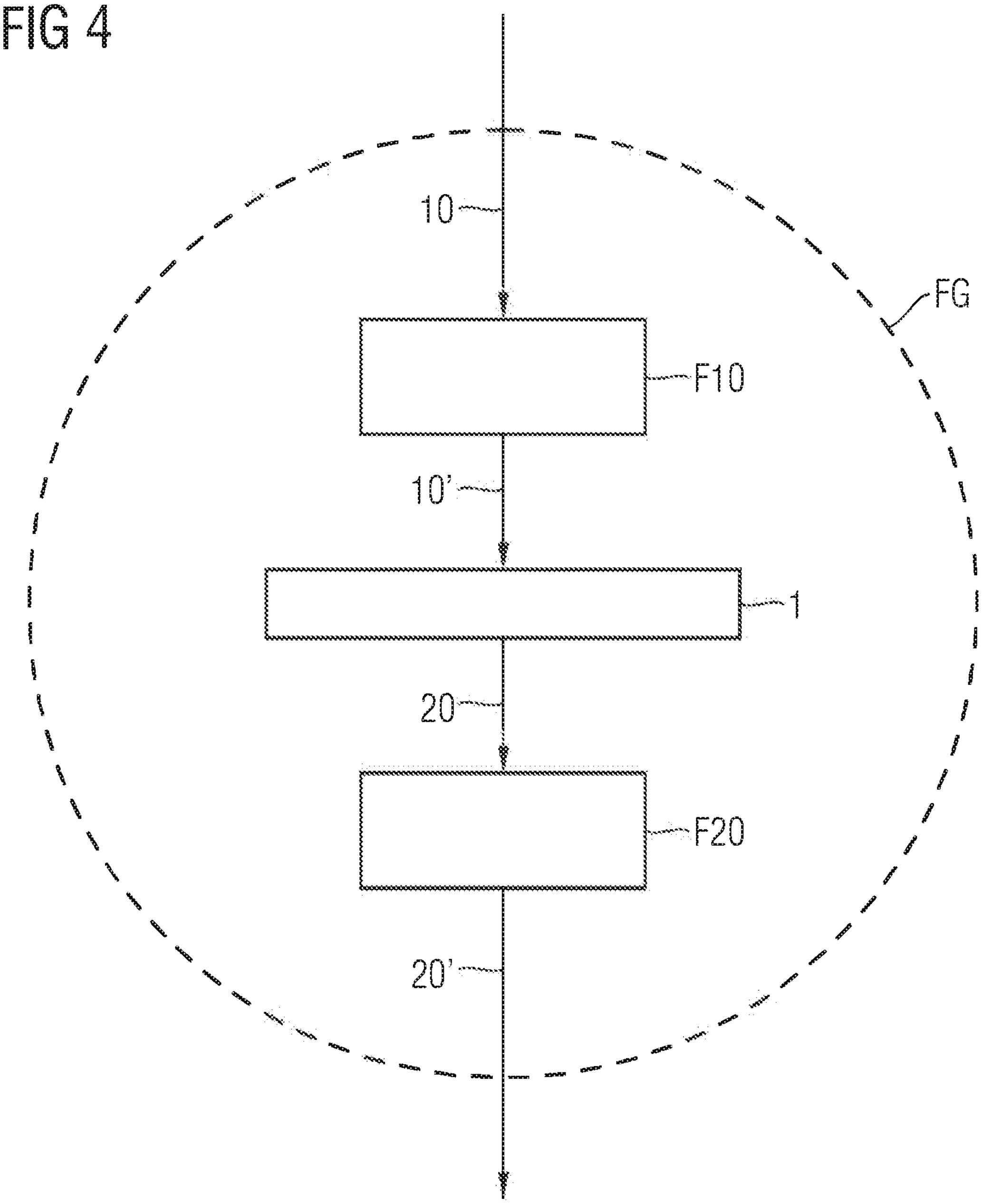
FIG. 4 shows a schematic view to illustrate the correction method in accordance with a third exemplary embodiment.

In a third exemplary embodiment, both correction mechanisms are used cumulatively. Not only the leading value 10 can be corrected before transfer to the synchronism function 1, but also the calculated following value 20 that is then additionally corrected. This is shown in FIG. 4 in the flow diagram in the logic of FIGS. 1 and 3.

The presently contemplated embodiment is particularly advantageous if, for example, a tubular bag machine itself is in turn part of a higher-level machine, and the leading value of the tubular bag machine is derived from the leading value of the entire machine via a flexible phase shift or reduction.

Figure 5:
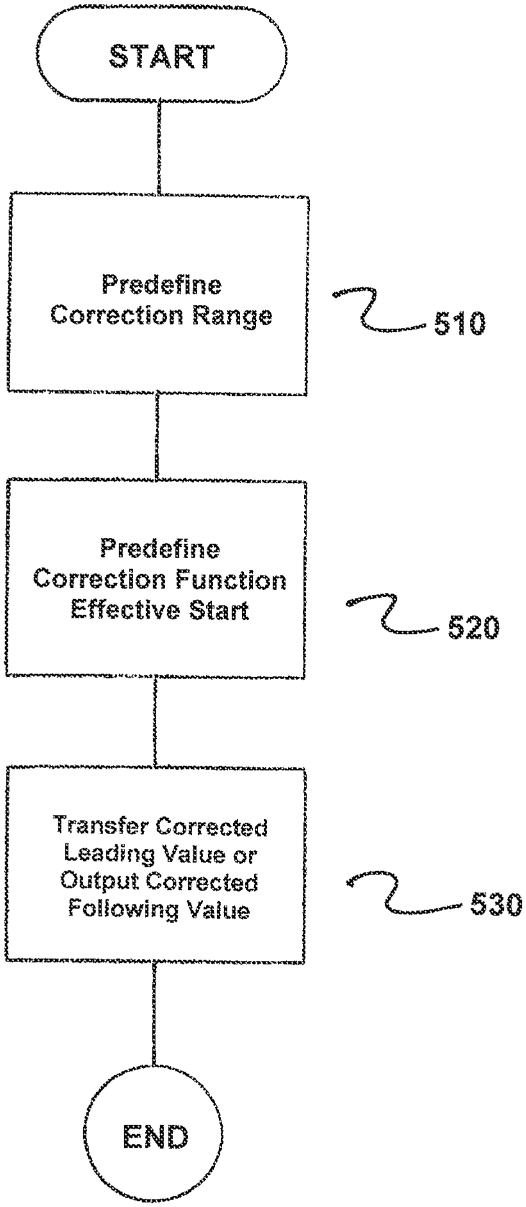
FIG. 5 is a flowchart of the method in accordance with the invention.

FIG. 5 is a flowchart of the method for correcting a leading value 10 and/or a following value 20 of a synchronism function 1, where the leading value 10 and/or the following value 20 is corrected via a correction function f1.

The method comprises predefining a correction range of the correction function f1 via an effective leading value path P1P2, a indicated in step 510.

Next, an effective start of the correction function f1 is predefined via an effective leading value position P1, as indicated in step 520.

Next, the corrected leading value 10' is transferred as an input to the synchronism function 1 and/or the corrected following value 20' is output as a setpoint to a following axis, as indicated in step 530.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for correcting at least one of a leading value and a following value of a synchronism function of an industrial automation system, at least one of the leading value and the following value being corrected via a correction function, the method comprising:

predefining a correction range of the correction function via an effective leading value path;

predefining an effective start of the correction function via an effective leading value position; and performing at least one of (i) a transference of a corrected leading value as an input to the synchronism function and (ii) an output of a corrected following value as a setpoint to a following axis; and correcting at least one of the leading value and the following value by applying, via a controller of the industrial automation system, a leading-value-position-dependent correction to physically adjust motion of the following axis while maintaining synchronism with a leading axis.

2. The method as claimed in claim 1, wherein the correction function is implemented via a system-specific function via the leading value path.

3. The method as claimed in claim 2, wherein the system-specific function comprises a polynomial function.

4. The method as claimed in claim 3, wherein the polynomial function comprises a polynomial function with a trigonometric component.

5. The method as claimed in claim 1, wherein the correction function is defined via a correction start position and a correction end position.

6. The method as claimed in claim 1, wherein the effective start and the effective leading value path are optimally chosen in relation to a process to be performed.

7. The method as claimed in claim 1, wherein the correction function is defined as a function depending on a leading value position.

8. The method as claimed in claim 1, wherein the correction function is constant at least at a first and second derivative of the correction function.

9. The method as claimed in claim 1, wherein the correction function comprises at least one of (i) a polynomial function, (i) a spline and (iii) a trigonometric function.

10. The method as claimed in claim 1, wherein, for the definition of the correction function, a maximum correction value is determined depending on at least one of the following variables: leading value speed, current gearing factor of the synchronism function, maximum dynamic values of the axis or predefined effective leading value path.

11. The method as claimed in claim 1, wherein the correction function is ended with the ending of the synchronization.

12. A controller of an industrial automation system for correcting at least one of a leading value and a following value of a synchronism function, the controller comprising:

a processor and memory having a control program function block;

wherein, upon execution of the control program function block, the processer is configured to:

predefine a correction range of the correction function via an effective leading value path;

predefine an effective start of the correction function via an effective leading value position; and perform at least one of (i) a transference of a corrected leading value as an input to the synchronism function and (ii) an output of a corrected following value as a setpoint to a following axis; and correct at least one of the leading value and the following value by applying, a leading-value-position-dependent correction to physically adjust motion of the following axis while maintaining synchronism with a leading axis.

13. The control device as claimed in claim 12, wherein the control program function block comprises a PLCopen function block.

* * * * *